United States Patent [19]

Grundy

[11] Patent Number: 4,548,085

[45] Date of Patent: Oct. 22, 1985

[54] TENSION MEASURING DEVICE AND METHOD FOR FLEXIBLE LINEAR MATERIAL

[75] Inventor: Reed H. Grundy, Murrysville, Pa.

[73] Assignee: PPG Industries, Inc., Pittsburgh, Pa.

[21] Appl. No.: 561,611

[22] Filed: Dec. 14, 1983

[51] Int. Cl.[4] ........................... G01L 5/10; G01L 5/16
[52] U.S. Cl. ............................... 73/862.48; 73/862.04
[58] Field of Search ............... 73/160, 862.04–862.07, 73/862.45, 862.47, 862.48, 159, 9

[56] References Cited

U.S. PATENT DOCUMENTS

| T934,002 | 5/1975 | Trail, Jr. . | |
|---|---|---|---|
| 3,186,220 | 6/1965 | Flinth . | |
| 3,204,454 | 9/1965 | Friman et al. . | |
| 3,376,740 | 4/1968 | Harvey . | |
| 3,444,731 | 5/1969 | Nieuweboer . | |
| 3,495,454 | 2/1970 | Heimes . | |
| 3,498,771 | 3/1970 | Bird et al. . | |
| 3,526,130 | 9/1970 | Canfield . | |
| 3,589,181 | 6/1971 | Palmatier et al. . | |
| 3,619,805 | 11/1971 | Bean . | |
| 3,650,717 | 3/1972 | Canfield . | |
| 3,739,633 | 6/1973 | Saxl ................................ | 73/862.47 |
| 4,042,876 | 8/1977 | Visioli, Jr. . | |
| 4,052,891 | 10/1977 | Bartlett . | |
| 4,067,234 | 1/1978 | Seney . | |
| 4,130,014 | 12/1978 | Eddens . | |

FOREIGN PATENT DOCUMENTS

| 1756097 | 3/1970 | Fed. Rep. of Germany ... | 73/862.04 |
|---|---|---|---|
| 0153682 | 12/1979 | Japan ................................ | 73/862.04 |

OTHER PUBLICATIONS

H. V. Mittmann et al., "A New Device for Simultaneous Measurement of Friction Force, Normal Force & Friction Coefficient"—*WEAR*, vol. 31, pp. 179–184, Jan. 1975.
Technical Bulletin 7003A—Modular LVDT Signal Conditioners by Engineering, Pennsauken, N.J.
Technical Bulletin 7005—LVDT Transducer Instrumentation by Schaevitz.
Article entitled "Modern Strain Gage Transducers ... Their Design and Construction" by Epsilonics, Jul. 1982.

*Primary Examiner*—Charles A. Ruehl
*Attorney, Agent, or Firm*—Kenneth J. Stachel

[57] ABSTRACT

The tension of flexible material can be measured with improved accuracy with the tension measuring device and method of the present invention. The tension measuring device has an engaging means, a bending means, at least one displacement means, at least two sensing means, and one or more indicating means. The engaging means contacts the flexible linear material and in conjunction with the bending means provides a fixed angle of bending to the linear material. The one or more displacement means are associated with the engaging means and are displaced in response to the fixed bending angle of the linear material. The two or more sensing means are positioned to each other at any nonlinear angular relationship in sensing engagement with the displacement means. The sensing means initiate signals in response to the displacement of the displacing means. The signals are conveyed by the conducting means to the one or more indicating means which provides the output from the signals of the sensing means as conditioned, scaled of magnitudes for tension and coefficient of friction.

25 Claims, 6 Drawing Figures

TENSION MEASURING DEVICE AND METHOD FOR FLEXIBLE LINEAR MATERIAL

The present invention is directed to a tension measuring device that measures the forces due to tension in at least two directions for flexible linear material which is stationary or which is being pulled from one location to another. Another aspect of the present invention is directed to a method of forming one or more bundles of filaments from a plurality of filaments and measuring the forces due to tension in at least two directions on the bundle of filaments during the forming process.

In numerous processes and devices, flexible linear material experiences tension in both static and dynamic applications. For instance, in the textile industry, tension is imparted to flexible linear material such as fibers and strands, when the fibers and strands are wound onto and unwound from various winding packages and from various supply packages. This tension can be measured by any of the numerous commercially available tension measuring devices.

The most common type of tension measuring device for flexible linear material is an inferential tension measuring device rather than a direct tension measuring device. The inferential device measures tension, when flexible linear material is in or passes through a guide system to contact a sensing arm, which is displaced by bending the flexible linear material. The displacement of the arm activates a tension indicator through mechanical, electrical, pneumatic or hydraulic means. For example, when electrical means are used, the displacement of the sensing arm initiates a change in inductance, capacitance, electromotive force or resistance of a sensitive cell, which indicates through a meter movement the magnitude of the tension.

The guide systems of these tension measuring devices involve at least partially bending the flexible linear material around a number of rollers in a series of rollers. The guide systems of some of these measuring devices bend the linear material no less than three times around three separate pulleys or rollers in order to measure the tension of the fibers or strands. With each bend or wrap of the linear material around the rollers, inaccuracies are introduced into the tension measurement because of the additional uncompensated friction, which the linear material encounters at each bend around the rollers. These inaccuracies can be reduced to approach zero for rollers other than the center roller on the guide system by reducing the degree of wrap of the linear material around the rollers.

Even with such a reduction, the friction resulting from the contact of the flexible linear material with the central roller not only leads to some inaccuracy but also results in the need for calibration. Every time the tension measuring device is used for tension measurement of flexible linear material with different physical dimensions and/or chemical characteristics; for example, for fiberous linear material, where a different fiber diameter or a different fiber coating, or a different number of fibers in a strand are used, the friction about the central roller will change. As a result, the tension measuring device would require calibrating everytime it is used with linear material with different physical or chemical characteristics.

Also the reduction of inaccuracies in traditional tension measuring devices by the wrap reduction approach would eliminate the possibility of using existing rollers over which the flexible linear material is wrapped in current processes as the rollers for use in measuring tension. For example, some of the processes in the textile industry, where a degree of wrap of the fibers or strands around a roller is necessary for the process include: forming strand from a plurality of fibers, where the rollers are gathering shoes, and winding or rewinding strand from one package to another. Therefore, in these and similar processes such rollers could not be used to assist in tension measurement because the degree of wrap about the roller, if reduced to approach zero, could detrimentally affect the process.

In one particular textile process, the measurements of tension on flexible linear material like strands that are formed from a plurality of filaments being drawn from a source of supply of filament forming material involves the use of a tension measuring device in what can be a rather difficult environment for a measuring device. Typically, fibers are formed from a source of fiber forming material at elevated temperatures and in the presence of sprays of water or chemical compositions used to size the fibers after their formation. The environment of fiber formation limits the placement of a tension monitoring device to locations in the process where the heat and moisture would not affect the tension measurements. For all practical purposes, the influence of heat and moisture from the forming process cannot be completely eliminated in using currently available tension monitoring devices. Therefore, in addition to the inaccuracy in the tension measurement due to uncompensated friction added by the rollers of the tension measuring device, when measuring tension during fiber formation, additional inaccuracies creep into the measurement of the tension from the heat and moisture present in the environment of the fiber forming process.

An example of a tension measuring device and a method for measuring tension in linear materials such as glass fiber strands is shown in U.S. Pat. Nos. 3,526,130 and 3,650,717 (Canfield). In these patents, the tensile forces are measured in traveling linear flexible material by turning the linear material a predetermined angular amount along a surface, which is connected by a horizontal member to a longitudinal member in which strains are induced at a location along its length. The strain in the longitudinal member is sensed as an indication of the magnitude of tension on the material. As with the commercially available tension measuring devices, this device would not compensate for the friction experienced by the strand in turning the strand a predetermined angular amount on the surface. Also, if this device is located too close to the fiber forming section of a fiber forming process, additional inaccuracies in the tension measurement would be experienced due to the heat and moisture associated with the fiber forming process.

It is an object of the present invention to provide a tension measuring device, tensiometer, which has improved accuracy in the tension measurement because the tensiometer determines the coefficient of friction of the flexible linear material as the material bends around a roller or contact device and because the tensiometer can reduce the effect of the environment on the measurement of tension for the flexible linear material.

It is an additional object of the present invention to provide a measurement of input and output tension around a tensiometer as well as the measurement of the coefficient of friction between the flexible linear material and the measuring device in a process which gathers a plurality of flexible linear material into one or more bundles of flexible linear material.

It is a further additional object of the present invention to provide an in-line tensiometer that does not affect the normal running of the fiber forming process and has improved accuracy.

It is an additional further object of the present invention to provide a method of forming fibers into strands, wherein the tension on the strands is more accurately measured.

It is another additional object of the present invention to reduce the need to recalibrate the tension measuring device when the type of flexible linear material is changed on which the tension is to be measured.

SUMMARY OF THE INVENTION

These and other objects of the invention are accomplished by the tension measuring apparatus and process for flexible linear material of the present invention.

In its broadest aspects, the tension measuring device for flexible linear material of the present invention is comprised of: an engaging means to contact the flexible linear material; a bending means, which in conjunction with the engaging means provides a fixed angle of bend for the flexible linear material; at least one displacement means associated with the engaging means, at least two sensing means which are positioned at any angular relation other than 0° or 180° or 360° to each other and in sensing engagement with the displacement means, conducting means for the two sensing means for the conveyance of signals initiated by the sensing means, and one or more indicating means to provide the output from the signals of the sensing means conveyed to the indicating means by the conducting means.

The displacement means is associated with the engaging means of the flexible linear material in such a manner that the displacement means is displaced in response to the fixed bending angle of the flexible linear material. The fixed bending angle of the flexible linear material is provided by the bending means in conjunction with the engaging means. The sensing means, which have a plane substantially parallel to the plane of the flexible linear material resulting from the fixed angle of bending, sense the displacement of the displacement means in at least two directions. The sensing means initiates signals in response to the sensing of the displacement and the signals are carried or conditioned and carried by the conducting means to the one or more indicating means. The indicating means can give the output from the signals as the horizontal and vertical components of the tension which can be calculated into the magnitude of the tension and/or coefficient of friction. Also the indicating means can output directly the magnitude of the tension and/or the coefficient of friction. The coefficient of friction may be referred to as the drag vector due to contact of the flexible linear material with the engaging means. When there is one displacement means, the means can be a cantilever beam. More than one displacement means can be comprised of an arrangement of beams free for displacement about flexural pivots located at opposite ends of the displacing beams. The displacing beams are interconnected so that one or more displacing beams can be horizontally displaced while one or more other displacing beams can be vertically displaced. Such an orthogonal arrangement allows for different directions which can be sensed separately by the sensing means.

In a narrower aspect of the present invention, the tension measuring device for flexible linear material has an arrangement of more than one displacement means. The arrangement of the multi-displacement means has a planar configuration and is comprised of generally similar top and bottom opposing surfaces and an outer and inner portion which are spaced apart from each other except for one situs of attachment. The outer portion which extends from the top surface to the bottom surface has at least one beam which is free for displacement along at least one axis. The displacement is about at least one flexural pivot means located on connecting beams at opposite ends of the displacing beam. The connecting beams are at some angular relation to the displacing beam and they connect the displacing beam to a second beam. The second beam opposes the displacing beam in substantially the same plane along the longitudinal axis of the outer portion. The second beam can function as a fixed beam or a second displacing beam depending on how the planar tension measuring device is used. The second beam and the displacing beam are connected together in some angular relationship by the connecting beams, one each at opposite ends of the displacing beam and second beam. The connecting beams both have the one or more flexural pivots, which can be one flexural pivot for each connecting beam constituting the entire length of the connecting beam, or which can be more than one spaced apart flexural pivot for each connecting beam. With the angular relationship of the connecting beams to the displacing beam and second beam, the continuous multi-sided planar outer portion is formed for the planar tension measuring device. The planar shape of the outer portion can range from quadrilaterals to shapes having more than four sides, where the displacing beam and second beam are straight and the connecting beams have more than one side. The inner portion which extends from the top surface to the bottom surface has at least one displacing beam which is free for displacement along at least one axis. The axis of displacement is at an angular relationship of other than 0°, 180°, or 360° from the axis of displacement for the displacing beam in the outer portion. The displacement is about one or more flexural pivot means located on connecting beams, where one connecting beam is located at each opposite end of the displacing beam. The one or more flexural pivots enable the displacing beam to be displaced along at least one axis. The flexural pivot means can constitute the entire length of the connecting beam or the connecting beam can have more than one flexural pivot means in spaced apart relationship to each other on each connecting beam. The connecting beams are at some angular relation to the displacing beam and these connecting beams connect the displacing beam to a substantially fixed beam in the inner portion. The substantially fixed beam of the inner portion is attached to the displacing beam of the outer portion at one site of attachment. The site of attachment partially fixes the fixed beam in reference to the displacing beam of the inner portion. The attachment site also maintains the spaced apart relationship of the outer portion from the inner portion.

The spaced apart relationship of the inner and outer portions other than at the site of attachment allows for displacement of the displacing beams predominantly about the flexural pivot means for each portion along different displacement axes. When this planar multi-displacement means configuration is used with the engaging means, bending means, at least two sensing means, conducting means and at least one indicating means of the tension measuring device of the present invention, the engaging means is affixed to either the displacing beam of the inner portion or the second beam of the outer portion. When the flexible linear material is bent at a fixed angle by the bending means, and engaging means, the displacing beams at both portions are displaced predominantly about the flexural pivot means and one sensing means detects displacement of the outer portion along one axis, while the other detects the displacement of the inner portion along a different axis. These detected displacements correspond to the force components of the tension and coefficient of friction or drag vector. The detected displacements are conducted and indicated by the appropriate means so that the magnitude of tension and coefficient of friction or drag can be calculated or indicated.

Another aspect of the present invention is a method for measuring tension in at least two directions for flexible linear material. First, the flexible linear material is engaged to cause a fixed angle of bending of the flexible linear material. As a result of the engagement, one or more beams associated with the engaged flexible linear material are displaced. The displacing beam or beams have one or more ends fixed either directly or indirectly in a support. The displacement of the one or more beams is sensed in at least two directions that have an angular relationship to each other in the same plane of any angle other than 0°, 180°, or 360°. A signal is initiated for each sensed displacement. The sensed signals are conducted so that values for the signals can be indicated directly for calculation of the magnitude of tension and/or coefficient of friction. Also the sensed signals can be conducted with scaling and calculating to yield the magnitude of the tension, while accounting for coefficient of friction.

DETAILED DESCRIPTION OF THE INVENTION AND PREFERRED EMBODIMENT

Figure 1:
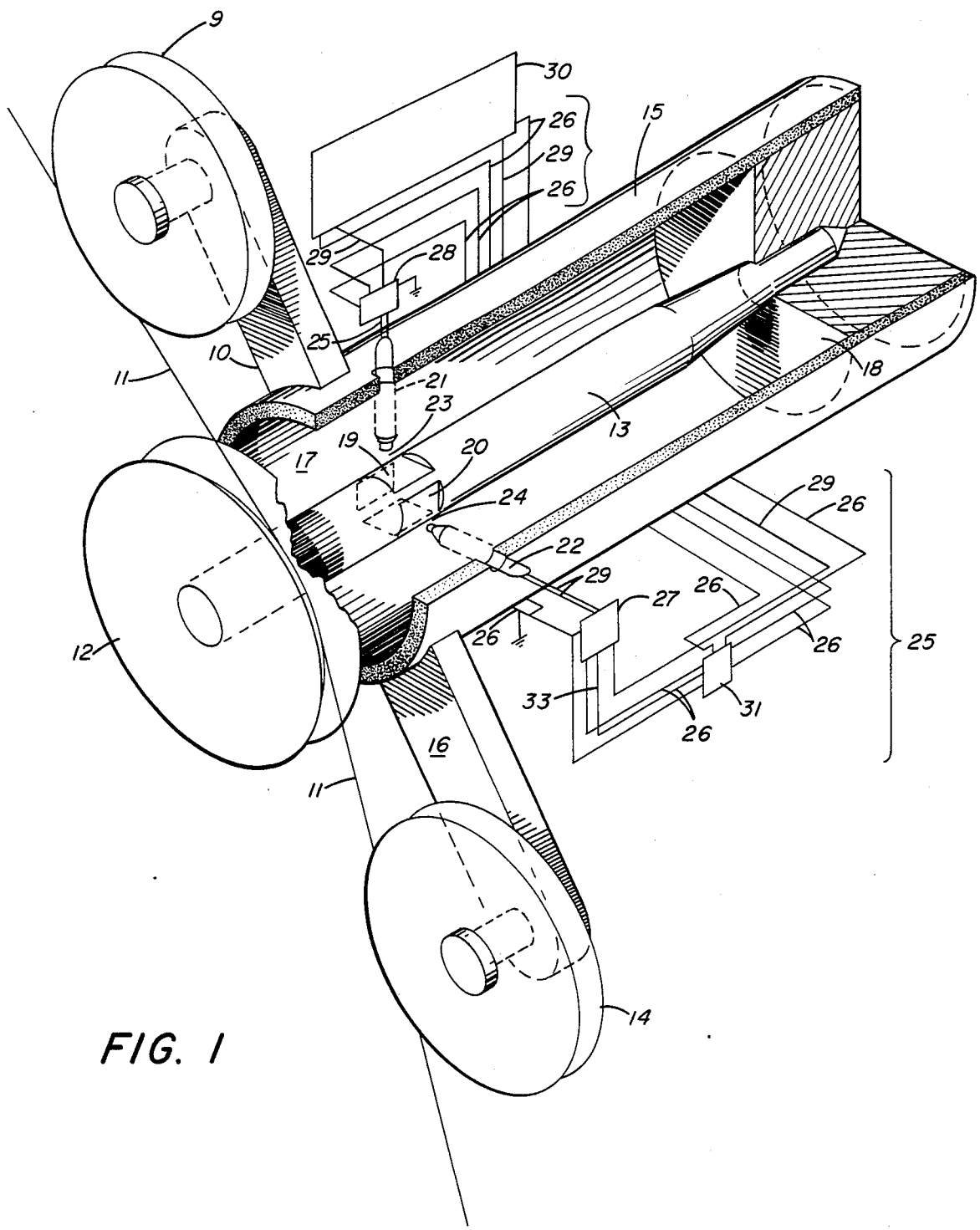
FIG. 1 is an isometric, cutaway view of the tension measuring apparatus of the present invention, where a single displacement means is shown with the bending means and the conducting means and indicating means are shown diagramatically.

Several of the numerous improvements available from the apparatus and method of the present invention include: reducing the need to calibrate the tension measuring device, when there is a change in the chemical and/or the physical characteristics of the flexible linear material to be measured for tension; improved accuracy in measuring tension by accounting for the horizontal and vertical force components of tension; determining the tension with the inclusion of the effect due to the coefficient of friction; and improved accuracy in measuring the tension of the flexible linear material during any processing of the flexible linear material, for instance, during the formation of flexible linear material such as filamentary material from heat softened material.

The accuracy of measuring tension in flexible linear material is affected by the invasiveness of the apparatus used to measure the tension. When the tension measuring device includes additional angles or bends in the processing of the flexible linear material by the use of rollers or levers contacting the flexible linear material, the coefficient of friction from the production of the additional angles and bends can cause a discrepancy in the tension measurement. The coefficient of friction may more appropriately be referred to as the drag vector resulting from the contact of the flexible linear material with the tension measuring device. Also, these additional angles and bends in the flexible linear material can detrimentally affect the efficiency of processing the flexible linear material. In addition, the accurate measurement of tension involves measuring tension with a device which is responsive in the linear portion of the stress/strain curve for the element of the tension measuring device being stressed and/or strained. So hysteresis within the tension measuring device should be kept to a minimum. Also, in measuring tension on flexible linear material, the versatility of the tension measuring device is an advantage for measuring the tension on different types or constructions of flexible linear material. Inaccuracies in tension measurement will not only be introduced from the use of additional angles and bends for measuring tension use but any alteration in the type or construction of the flexible linear material on which tension is measured will compound the inaccuracies. An example is in a process for treating flexible linear material such as single strand yarn. Here the rollers causing the bend in the yarn on which the tension is to be measured will result in a certain value for friction and a tension measuring device will give an output of a certain value for tension. If multistrand yarn is then treated in the same process sometime after the single end yarn, the friction due to the contact between the multi-strand yarn and the rollers and/or levers used in the tension measuring device to exert an angle or bend in the yarn will be greater than that for the single end yarn. Therefore, the tension measuring device will have to be recalibrated in order to get a more accurate output for the value of tension. This recalibration is needed anytime a change in the type or construction of flexible linear material would increase or decrease the friction at the contact points with the additional rollers and/or levers used by a tension measuring device to achieve a value for tension.

The tension measuring device of the present invention needs only one contact point with the flexible linear material to result in an angle or bend of the flexible linear material to measure tension. For instance, angles or bends already existing in a process for forming or treating flexible linear material can be used with the tension measuring device of the present invention for the measurement of tension. Also, the tension measuring device of the present invention measures two axes of force simultaneously and accounts for the coefficient of friction or drag vector to reduce the need for recalibration when different types or constructions of flexible linear material are to have their tension measured. Because of the forces being measured simultaneously along two different axes for a component of friction and the component of tension, the true input and output tension can be measured along with the coefficient of friction.

Although the most advantageous use of the tension measuring device and method of the present invention is in the process of forming or treating flexible linear material such as filamentary material, the tension measuring device can also be used anywhere where flexible linear material is under tension such as in being stationary but under tension or in being conveyed from one or more locations to a different location. The flexible linear material can be any filamentary material like fibers, bundles of fibers, strands, yarn, ropes, wires, cables, fabric and any sheet materials like metallic sheet and polymeric sheets and films. Also, although it is most advantageous to use a tension measuring device and method of the present invention in an in-line fashion in a process using existing angles and bends in the process for forming or conveying or treating filamentary material, the tension measuring device of the present invention can also be used as a portable tension measuring device. Such a portable tension measuring device would have at least two rollers to cause a guide path for the strand so that a predetermined angle or bend is engendered in the strand to measure the tension. Even with this use of the tension measuring device, the recalibration of the unit upon changing the type or construction of filamentary material would not be needed.

Turning now to FIG. 1, there is shown the tension measuring apparatus of the present invention having an engaging means to contact flexible linear material like filamentary material, one displacement means, two sensing means, a conducting means and at least one indicating means. The filamentary material, 11, is engaged by an engaging means 12, where the engaging means can be any contact surface over which the filamentary material can experience a fixed angle or bend. The engaging means 12 of FIG. 1 is attached to beam 13 through a rotatable or nonrotatable attachment. The engaging means 12 of FIG. 1 is shown as being a roller having a V-groove in its peripheral surface where the filamentary materials contact the peripheral groove. The engaging means can also be a groove on beam 13 rather than a separate roller as long as the filamentary material stays in one location on beam 13. In addition, the engaging means 12 can be any portion of a roller that would allow for a fixed angle or bend of the filamentary material. The fixed angle or bend of the filamentary material is effected in conjunction with a bending mean 14, which is shown in FIG. 1 as being another roller, and contact surface 9 for the filamentary material 11. As shown in FIG. 1, the two rollers 12 and 14 contact the filamentary material 11 at opposite sides and contact surface 9 tangentially contacts the filamentary material 11 on the same side as roller 14. The bending means 14 can be any contact surface sufficient to assist in imparting a fixed angle or bend in the filamentary material over the engaging means. The bending means can be any portion of a roller or bar or the like device to maintain the filamentary material in a position to impart the fixed angle or bend.

In addition, the bending means could be any contact points existing in a process for treating or forming the filamentary material. In this case, the engaging means 12 would be the only roller of the tension measuring device to contact the filamentary material. The entire tension measuring device would be supported in such a manner before and/or after the contact surfaces of the process to impart the fixed angle or bend of the filamentary material 11 over engaging means 12. This arrangement is described in conjunction with FIG. 4.

In the arrangement of FIG. 1, the bending means 14 is supported by support member 15 through attachment member 16. The bending means can be rotatably or nonrotatably, and preferably nonrotatably, attached to attachment member 16. The attachment member 16 is securely attached to support member 15 to hold the bending means 14 in a fixed relation to the engaging means 12. The contact surface 9 is secured to support member 15 by attachment member 10. The attachment of attachment members 10 and 16 to the support member 15 can be adjustable so that bending means 14 and contact surface 9 can be altered and then securely fastened in relationship to the engaging means 12. Also, support member 15 can serve as a housing by enclosing a substantial portion of beam 13. Where support member 15 is a housing, at least one end of the housing is open so that beam 13 can emerge for attachment to engaging means 12. It is preferable to have the support member 15 serve as a housing for beam 13, especially in the processing environment for filamentary material where moisture may be present. As shown in FIG. 1, support member 15 is a cylindrical housing having an opening 17 through which the beam 13 can emerge.

The support member 15 when serving as a housing, can be made of any material which is of sufficient rigidity to support bending means 14, contact surface 9 and attachment members 10 and 16. Nonexclusive examples of such rigid material include metals like stainless steel and the like metals known to those skilled in the art like molded polyesters, epoxies, phenolic, urea and/or melamine aldehyde condensates and other like polymeric materials known to those skilled in the art. And materials which have a high resistance to the flow of heat such as quartz and/or composites of polymers reinforced with graphite fibers and the like materials known to those skilled in the art to have a low coefficient of thermal expansion. When support member 15 is not serving as a housing, the support member extends from the beam support member 18 and is of sufficient dimension to adequately support attachment members 10 and 16 and bending means 14.

Beam 13 is the displacement means which is displaced in response to the fixed angle or bend of the filamentary material in contact with engaging means 12. Beam 13 is mounted for support in beam support member 18. Preferably, when the displacement means is a single beam, such as beam 13, the mounting in the beam support member 18 is a cantilever mounting. The housing can surround and enclose the beam 13 by the use of any shape having one or more peripheral sides such as cylindrical, rectangular, triangular or any other polyhedron and the like. In addition, the opening 17 in the housing can be of any diameter which is sufficient to allow for the radial deflection of beam 13 about a 360° radius around the central axis of the distal portion of beam 13. The attachment of beam 13 to the beam support member 18 can be by any cantilever-type method of attachment known to those skilled in the art such as press fittings, clamp attachments, and nut and bolt arrangements. The beam support member 18 can be an end to the support member 15 when the latter serves as a housing.

The longitudinal dimension of beam 13 allows it to extend for a sufficient length to have adequate sensitivity in deflecting when the filamentary material 11 is bent at a fixed angle over a portion of engaging means 12. When support member 15 serves as a housing, the beam has a length which is greater than the longitudinal dimension of the housing so that beam 13 extends through opening 17 to contact the filamentary material by attachment of beam 13 to engaging means 12. The sensitivity of the deflection of beam 13 is such that when the beam is displaced by the tension on the filamentary material, the displacement can be measured and preferably results in a response which falls in the linear portion of a stress/strain curve. Preferably, the length and diameter of such a single beam 13 used as the displacement means are on the order of about 70 to about 200 millimeters for a length and about 5 to about 15 millimeters for a diameter. The beam is preferably continuous to assure that the deflection of the beam falls within the linear portion of a stress/strain curve for the beam. Therefore, the deflection of the beam will be subject to little or no hysteresis effect for the deflection of the beam beyond the linear portion of the stress/strain curve. The diameter of the beam need not be uniform for the entire length of the beam and the beam may have a concavity or taper in the diameter toward the end of the beam proximate to the beam supporting member 18. Such a non-uniform diameter could be a shape such as an hourglass shape. Whether or not the beam is tapered or has a non-uniform diameter depends upon the amount of tension to be measured in the filamentary material. If the amount of tension is high, around 20 kilograms, the beam will have a sufficient diameter and length at a uniform diameter of around 15 millimeters and a length of around 150 millimeters to be deflected in a measurable fashion. Where tension on the filamentary material is less than 20 kilograms, the aforementioned length and diameter of the beam may not be suitable and the beam should be and preferably is tapered. The taper can continue to a minimum diameter of around 1 to around 3 millimeters for the beam. Generally, the beam can have any shape known to those skilled in the art for use as a cantilever beam such as cylindrical, rectangular, triangular or any other polyhedron and the like. In addition, the beam can be either a hollow or solid beam but the beam is preferably a solid beam.

On the beam at some distal point from the mounting of the beams in beam support member 18, the beam is adapted to be sensed by various commercially available sensing means. The adaptation of the beam for sensing involves at least two distinct areas on the beam. These two areas of adaptation are shown in FIG. 1 as target areas 19 and 20. These areas are in an angular relationship to each other at an angle other than 0°, 180° and 360°. Preferably, the angular relationship between the two areas is around 90°. With the orthogonal angular relationship of around 90°, the separation of the tension components into orthogonal components is more easily accomplished. When the angular relationship is not around 90° but is between an angle greater than 0° and less than around 90° or greater than around 90° and less than 180° or greater than 180° but less than around 270° or greater than around 270° but less than 360°, the separation of the tension into the orthogonal components is more complicated. The complication is added due to the cross coupling effect in separating the tension force into its orthogonal components. The cross coupling effect can be taken into consideration in calculating the orthogonal components of the tension on filamentary material and the tension can be adequately resolved into the orthogonal components. The method of resolution of the cross coupling affect can be by any method known to those skilled in the art for dealing with coupled forces. The target areas 19 and 20 can be areas known by those skilled in the art to be sensed by commercially available sensing means. Nonexclusive examples of such areas include magnetic and/or resistive spots or flat surfaces as shown at 19 and 20 in FIG. 1. The flat surfaces can also be achieved by adding a rectangular or polyhedral structure on the beam where the rectangular or polyhedral structure has a central opening for attachment like a collar to the beam.

In sensing engagement with the beam target areas, 19 and 20, are sensing means 21 and 22 respectively. The sensing means 21 and 22 are securely attached to support member 15 which may serve as a housing for the tension measuring device. If support member 15 is not a housing for the device, support member 15, which is securely attached to beam support member 18, would consist of two separate support members or as many separate support members as are needed to support the number of sensing means. In addition to support member 15, another support member would be used, which would be a portion of housing support 15 in FIG. 1 so when support 15 is a non-housing support, these supports would be two distinct support members extending from beam support member 18. The sensing means are located in sensing engagement with the beam target areas. The sensing engagement allows for radial deflection about 360° along the axis of the beam. Therefore, the sensing engagement will allow for small gaps between the sensing means and the beam target areas such as gaps 23 and 24 in FIG. 1. The gaps 23 and 24 can range from a distance of greater than 0 to about 0.5 millimeters and preferably, about 0.005 to about 0.3 millimeters. When the beam target areas are situated in around a 90° relationship to each other on the beam, the sensing means are associated with each other in the same angular relationship of around 90°. The 90° relationship is preferable so that one sensing means like sensing means 21 is associated with one beam target area like beam target area 19. When the beam target areas are at an angular relationship to each other of other than around 90°, but not 0°, 180° or 360°, the sensing means are associated with each other in the same angular relationship in order to have the one to one relationship with the beam target areas.

The type of sensing means used must correspond with the type of beam target area used. For example, if the target areas 19 and 20 are resistive areas then sensing means 21 and 22 should be eddy current displacement transducers like those available from Kaman Sciences Corporation, Colorado or like those described in U.S. Pat. No. 4,042,876 entitled "Eddy Current Gauge for Monitoring Displacement Using Printed Circuit Coil", which is hereby incorporated by reference. If the target areas are connections with magnetic areas within the sensing means, then the sensing means are linear variable differential transducers (LVDT) like those available from Schaevitz Engineering, Pennsaulin, N.J. Preferably, the former system is used for the tensiometer of FIG. 1, where the sensors have a product designation of KD 2310-0255 electronic units. Also the sensing means can be of other types when the target areas are flat surfaces. Types of sensing means used in this case include strain gauges, foil-type and coil-type sensor elements and any other sensor elements of known construction which can be at least temporarily securely attached to a support by adhesive attachment or mechanical attachment or the like to a support member or housing. The sensing means senses the deflection of the beam in the directions in which the individual sensor is engaged with the beam. The sensing means also convert the mechanical vibrations of the beam into electrical energy, thereby, acting as a transducer.

The conducting means 25 is power supply circuit 26, signal conditioners 27 and 28 and signal conducting circuit 29. The conducting means enables the sensing means 21 and 22 to initiate signals in response to a displacement of beam 13. These signals are conveyed by the conducting means 25 to an indicating means 30. The power supply circuit 26 provides power to the sensing means 21 and 22 via the signal conditioners 27 and 28, and to the signal conditioners 27 and 28, and, if needed, to the indicating means 30. The power for the power supply circuit 26 is from power supply 31, which can be any device known to those skilled in the art for powering sensing means, signal conditioners and indicating means. Non-exclusive examples of power supplies include: alternating current supplies, direct current supplies, and solar supplies. Although the power supply circuit is indicated in FIG. 1 as supplying all the power needed for the sensors, conditioners and indicators, separate power supplies may be used for each of these. Also, FIG. 1 indicates examples of ground wiring for the power supply circuit and signal conducting circuit. Any other circuit arrangements for electrically powering sensors, signal conditioners and signal indicators that are known to those skilled in the art may be used. Preferably, the power supply for the Kaman Eddy Current sensors is a direct current power supply. A nonexclusive example of a power supply is the dual voltage power supply available from Hewlett-Packard Company, California under the product description 6205.

In addition, conducting means 25 provides for signal conditioning by the signal conditioners 27 and 28 for each signal initiated by the sensing transducers 21 and 22 respectively. Since the signal initiated by the sensing transducers are generally very small in magnitude, the signals must at least be conditioned by amplification. In addition, depending on the particular type of sensing transducers used, the transducing signals may have to be demodulated, filtered or converted from current to voltage or vice versa. In addition, the signal conditioners can receive the power from the power supply before the sensing transducers to provide excitation of the input to the sensing tranducers. For example, the LVDT type sensing transducers require constant amplitude AC voltage at a frequency not readily available. So the signal conditioner would also have an amplifier with amplitude regulation on its output to provide the necessary input to the sensing transducer from an AC power supply. For a DC power supply, an oscillator of appropriate frequency would be used before the amplifier. Although for some sensing means, the power supply may be connected directly to the sensing means. The signal conditioners 27 and 28 may also provide for scaling of the signals from the sensing transducers 21 and 22. Scaling allows for a relationship of the voltage or current changes initiated by the signals of the sensing means 21 and 22 to units of force for measuring tension. Scaling can be accomplished by any method known to those skilled in the art for relating measurement units of one energy form to units of another energy form. For instance, one or more potentiometers can be connected in parallel with each amplifier for the output signals of the sensing means. The potentiometers are set to determine the output voltage per beam displacement in some calculatable relationship, preferably a 1:1 relationship. The conducting means 25, although shown as being electrical connections with the indicating means 30, can also be connected through mechanical, pneumatic or hydraulic connecting means.

Indicating means 30 receives the output signals generated by the sensing means 21 and 22 which are conveyed to it by conducting means 25 in response to a deflection of beam 13. The indicating means 30 can be comprised of one or more indicating devices to indicate the separate outputs of the sensing means 21 and 22 or to indicate separate scaled outputs from signal conditioners 27 and 28, or to perform calculations on the outputs from the sensing means to indicate tension. When the indicating means indicates the separate outputs of the sensing means, or separate scaled outputs of the signal conditioners, the indicating means can be comprised of two indicating devices. A nonexclusive example includes two digital voltmeters such as Fluke voltmeters under the product designation of 8000A. The voltmeters can read the different voltages resulting from deflection of beam 13 due to the change in the source voltage, or the voltmeters can be brought to zero for no deflection of beam 13 and read just the change in voltage due to the beam's deflection. Also the voltmeters can read a change in the volts of the sensing means as a change in gram, kilograms or any weight or force unit from the scaled conditioned signals of the signal conditioning means 27 and 28 to indicate the orthogonal force components of tension. With the orthogonal force components of tension, the true tension in and out can be calculated as explained with FIGS. 5 and 6. These values can be calculated in any manner known to those skilled in the art on any devices known to those skilled in the art including computers programmed with algorithms including the formulae described with FIGS. 5 and 6. Also, these values can be calculated by an indicating means having two similar indicating devices, where these devices are connected between the high output terminals of each device for one different conditioned signal from the signal conditioning means 27 and 28. Where a computer is used, the computer could be wired directly to the indicating means 30 or could be the indicating means 30 to yield values for the tension in and out of the predetermined angles of bend of the fibers or strands. Also the computer can be programmed with an algorithm for the scaling operation so that the scaling is performed by the computer indicating means rather than the signal conditioning means 27 and 28.

Figure 2:
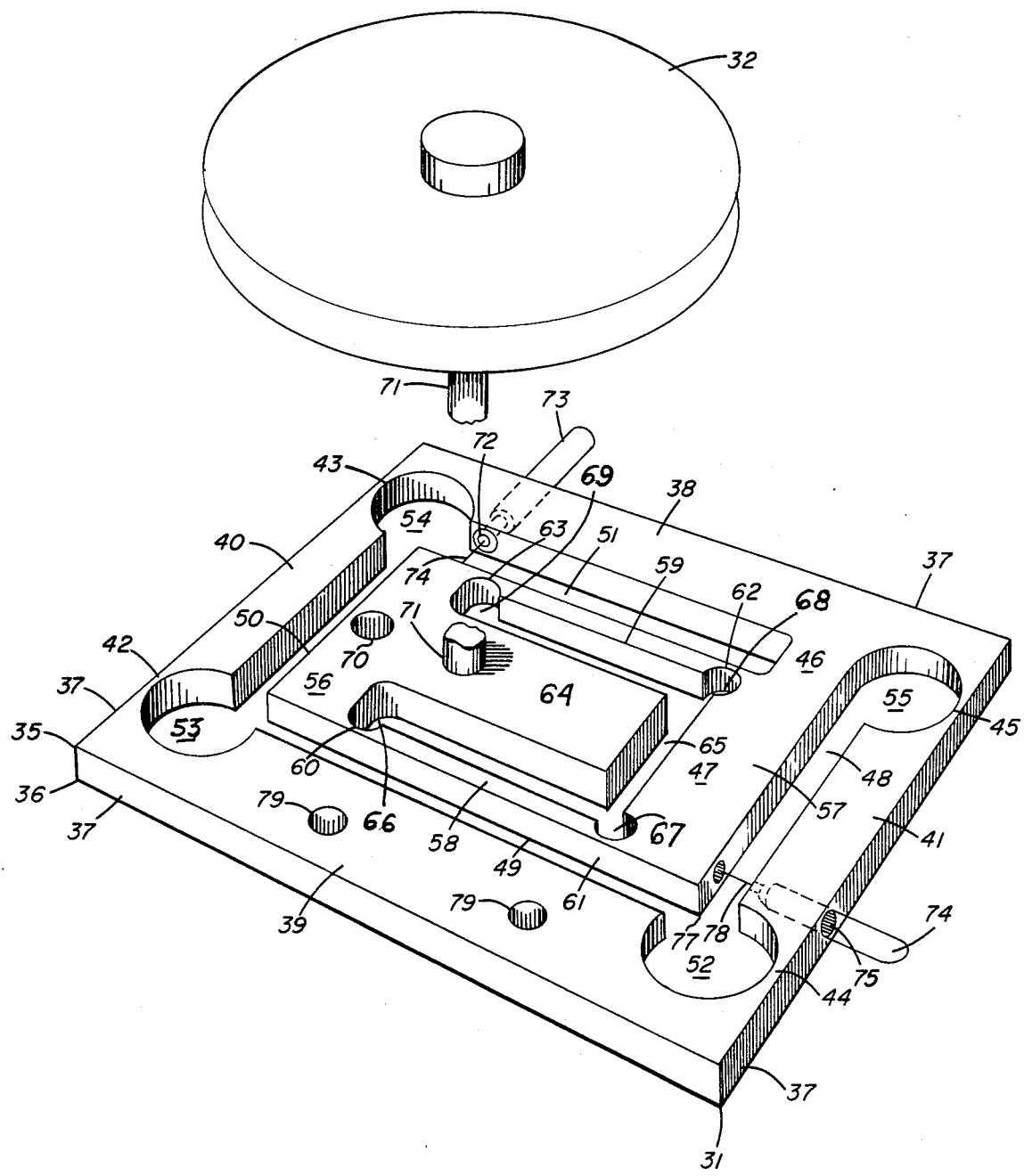
FIG. 2 is an isometric side view of the planar displacement means showing the top of the outer and inner portions with their site of connection, along with the sensing means and with a single engaging means, of the tension measuring device of the present invention, where the engaging means is elevated for purposes of a clear illustration of the outer and inner portions.
Figure 4:
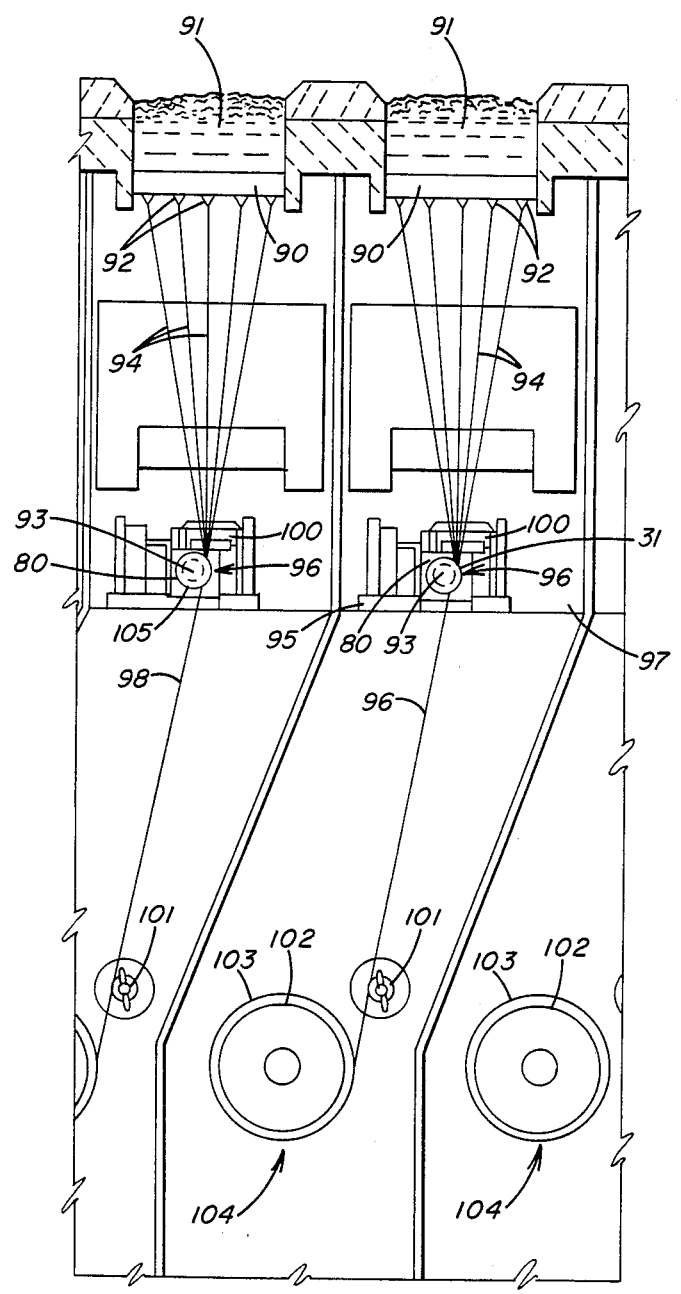
FIG. 4 is a diagramatic illustration of a typical glass fiber strand forming method of the present invention with the tension measuring device.

Now turning to FIG. 2, there is shown a displacement means for the tension measuring device which has more than one displacing beam. The displacing means of FIG. 2 generally designated by numeral 31 is shown in conjunction with an engaging means 32 for filamentary material which is not shown in FIG. 2. The filamentary material would contact the engaging means 32 as is shown in FIG. 4. The displacing means configuration 31 of FIG. 2 is shown as a block which generally has a quadrilateral shape with two surfaces, a top surface 35 and a bottom surface. The bottom surface, although not readily visible in FIG. 2, is indicated by numeral 36. The bottom surface is identical to the top surface except that it opposes the top surface. Although the block has a generally quadrilateral shape as shown in FIG. 2, the shape of the block can be any essentially planar-type shape. Examples of these various shapes include circular and any polyhedral shape. The block 31 has an outer portion indicated as 37 at the four sides of the block extending from the top surface 35 to the bottom surface 36. The outer portion 37 is comprised of one displacing beam 38, one second beam 39 and two connecting beams 40 and 41. The connecting beams 40 and 41 each have two spaced apart flexural pivot means. For connecting beam 40, the flexural pivot means are 42 and 43, and for connecting beam 41, the flexural pivot means are 44 and 45. The displacing beam 38 and second beam 39 are held together in the block by the connecting beams 40 and 41. The connecting beams attach the displacing beam 38 and second beam 39 in a nearly parallel fashion beyond the last flexural pivot means at both ends of parallel beams 38 and 39 to form the outer portion 37. The flexural pivot means 42, 43, 44 and 45 are reduced cross-sectional areas on connecting beams 40 and 41 respectively. It is preferred that the connecting beams 40 and 41 maintain the displacing beam 38 and second beam 39 in a parallel arrangement. Although it is preferred to have the two spaced apart flexural pivot means on each connecting beam, other arrangements are possible. For instance, both entire connecting beams could be flexural pivot means. Also, the distance between the two flexural pivot means on each connecting beam can be varied, but it is preferred that the flexural pivot means on each connecting beam have an equal distance separating them. The further the distance between the flexural pivot means on each connecting beam increases the sensitivity of the tension measuring device. Therefore, it is preferred that the distance between the two flexural pivot means on each connecting beam 40 and 41 be such that the flexural pivot means are next to the displacing beam and second beam at opposite ends of these beams 38 and 39. With the connecting beams 40 and 41 holding the displacing beam 38 and second beam 39 in near parallel arrangement, the displacing beam 38 is capable of displacement along one axis. In FIG. 2, this axis would be approximately from left to right or vice versa.

Spaced apart from the outer portion 37 except for only one connecting site 46 is inner portion 47. The spaced apart relationship of the inner portion 47 from the outer portion 37 is effected by a series of slots 48, 49, 50 and 51 which are arranged so that one slot is adjacent to and runs generally parallel to each of the four beams of outer portion 37 from the top surface 35 through the block to the bottom surface 36. The dimensions of the slots can have a width to allow for displacement movement of the inner portion and outer portion about two different axes in one plane and preferably about two substantially perpendicular axes. Any four of these slots can interconnect to form three expanded areas 52, 53 and 54. For example, as shown in FIG. 2, slot 48 interconnects with slot 49 to form expanded area 52 and slot 49 and slot 50 interconnect to form expanded area 53 and slot 50 and slot 51 interconnect to form expanded area 54. Although the expanded areas as shown in FIG. 2 have a generally circular shape, the shape of the expanded areas can be any shape to engender a reduced cross-sectional area at the flexural pivot means. In addition, two adjacent slots do not interconnect with each other such as slot 48 and 51 of FIG. 2 to form the connecting site 46 between the inner portion 47 and the outer portion 37. With the failure of two slots to connect, the noninterconnecting slot parallel to the displacing beam in the outer portion does not have an expanded area while the noninterconnecting slot laying parallel to the connecting beam of the outer portion does have an expanded area 55 at the end of the slot to form the second flexural pivot means 45 for connecting beam 41. In FIG. 2, the noninterconnecting slot which does not have the expanded area is slot 51 while the noninterconnecting adjacent slot which does have an expanded area is slot 48 with expanded area 55. The expanded areas form the flexural pivot means at opposite ends of the displacing beam 38 and second beam 39 in connecting beams 40 and 41 by reducing the cross-sectional area of the connecting beams 40 and 41 at these locations. For instance, expanded area 52 forms flexural pivot 44 and expanded area 55 forms flexural pivot means 45 in connecting beam 41. The connecting site 46 at the end of slot 51, where there is no expanded area forming flexural pivot means generally attaches the inner portion to a displacing beam in the outer portion. The connecting site 46 generally has a dimension sufficient to be stiff enough so as not to deflect under displacement conditions for the inner and outer portions and to maintain proper alignment of the inner portion 47 to the outer portion 37.

The inner portion 47 has at least a displacing beam 56 and a substantially fixed beam 57 and two connecting beams 58 and 59. Each connecting beam 58 and 59 has at least one flexural pivot means. Connecting beam 58 has spaced apart flexural pivot means 60 and 61 and connecting beam 59 has spaced apart flexural pivot means 62 and 63. The beams 56 and 57 are held together in nearly parallel fashion by connecting beams 58 and 59 by connecting with beams 56 and 57 at some point beyond the last flexural pivot means at each end of each connecting beam. Generally, the connecting beams 58 and 59 are nearly perpendicular and preferably perpendicular to displacing beam 56 and substantially fixed beam 57. Substantially fixed beam 57 extends from the connecting site 46 as shown in FIG. 2. This beam 57 is substantially fixed in that the displacement of the displacing beam 56 about flexural pivot means 60, 61, 62 and 63 is along one axis, and this is the major displacement that occurs for the inner portion 47. The displacing beam 56 in FIG. 2 displaces from approximately the top of the figure to the bottom of the figure and vice versa, or in other words, from left to right and vice versa in relation to substantially fixed beam 57. The substantially fixed beam keeps displacements along the other axis for the inner portion to a minimum. Since substantially fixed beam 57 has one attachment at connecting site 46 to the displacing beam 38 of the outer portion 37, some of the displacement of beam 38 also occurs in substantially fixed beam 57. This is the reason that beam 57 is only substantially fixed. Also substantially fixed beam 57 cannot be displaced along the same axis as displacing beam 56, although substantially fixed beam 57 can share the displacement of displacing beam 38 of the outer portion 37. This latter displacement of beam 58 is along an axis different from and preferably 90° different from the axis of displacement of displacing beam 56 of inner portion 47. Also, it is preferable that the displacing beam 56 has an extension 64 which extends toward the substantially fixed beam 57 for a distance where the extension 64 is adjacent to the nearly parallel connecting beams 58 and 59 without touching the substantially fixed beam 57 and while remaining spaced apart from this beam 57. As shown in FIG. 2, extension 64 extends from beam 56 parallel to connecting beams 58 and 59 to approach substantially fixed beam 57. By this arrangement, the inner portion 47 of block 31 has a U-shaped slot, 65, having expanded areas at each corner including the ends of the U-shape. These expanded areas are 66, 67, 68 and 69 in FIG. 2. These expanded areas form at each expanded area a reduced cross-sectional area in connecting beams 58 and 59 to form the flexural pivot means 60 and 61 for beam 58 and 62 and 63 for beam 59. Although it is preferred that the inner portion 47 has the U-shaped slot 65, the extension 64 need not be present or need not extend to the degree shown in FIG. 2 along side the nearly parallel connecting beams 58 and 59. If extension 64 is not present, the expanded areas 60, 61, 62 and 63 would merely be expanded areas of a quadrilateral, circular, or polygonal space between beams 56, 57, 58 and 59 rather than from a U-shaped slot between these beams. In addition, although FIG. 2 shows two flexural pivot means on each connecting beam, it is also possible to have only at least one flexural pivot means on each connecting beam. As is possible for the flexural pivot means on the connecting beams 40 and 41 of outer portion 37, the flexural pivot means for the connecting beams of the inner portion 47 can vary. The variability ranges from one flexural pivot means comprising most of each connecting beam to more than one flexural pivot means on each connecting beam in any spaced apart relationship to enable the displacement of displacing beam 56 along the one axis.

The extension 64 from displacing beam 56, when present, can have anywhere along the length of the extension a receptacle 70. This receptacle provides for attachment, preferably fixed attachment, of attachment member 71 which is attached to the engaging means 32 for the filamentary material. As indicated in FIG. 2, the receptacle 70 could also be located on displacing beam 56 if the extension 64 is not present or even if it is present.

The block 31 can be made of any suitable material such as: 4340 steel, 4140 steel, 410 stainless steel, 632 stainless steel, beryllium copper 25, aluminum, like T 2024-81 aluminum, and alumina ceramics like aluminum oxide. In both the inner and outer portions, when the connecting beams are connected in a nearly perpendicular fashion to the nearly parallel displacing beam 38 and second beam 39 of the outer portion and the displacing beam 56 and substantially fixed beam 57 of the inner portion, the nearly perpendicularness of the respective beams is generally in the area of 80° to 100° and preferably, around 90°, and most preferably, 90° in the undisplaced state. Also, with the connection of the beams to the nearly parallel displacing beams and substantially fixed connecting beam and second beam in the inner and outer portions respectively, the connection need not be of discrete beams to each other but may be formed as one piece with certain portions of the piece acting as the nearly parallel beams and the connecting beams.

The dimensions of slots separating the outer and inner portions and of the U-shaped slot in the inner portion generally have a width a little larger than the expected full scale deflection of the displacing beams for both portions. The width is generally in the range of about 1 to about 10 millimeters and a length ranging from about 10 to about 50 millimeters for a block having the dimensions shown in FIG. 2. The slots 48 through 51 between the outer portion 37 and the inner portion 47 are maintained in their proper width dimension by the width of connecting site 46. These slots and the U-shaped slot in the inner portion 47 allow for the displacement of the nearly parallel displacing beam of the inner beam 56 and the outer portion beam 38 around the flexural pivoting means. The flexural pivot means generally have a thickness of around 0.1 to about 1 millimeter, where the thickness is slightly less for the flexural pivot means of the inner portion, and have a width which is the thickness of block 31 going from the top surface to the bottom surface. The flexural pivot means can be made of the similar material to that of block 31 and can be a continuous portion of the connecting beams or can be continuous portions of one unit like the outer portion or the inner portion of the block. Also, the flexural pivot means can be different material from that of the rest of the block and the flexural pivot means can be attached to the connecting beams of the inner and outer portions by any attachment means known to those skilled in the art such as fasteners, adhesives and the like.

The dimensions of the displacing beam and second beam of the outer portion and the displacing beam and substantially fixed beam and connecting beams of the inner portion have a sufficient length and thickness so that one portion is maintained stationary along one axis when the other portion is deflecting along that axis. This is effected by also having the block 31 of the multi-beam displacement means fixed in conjunction with the bending means and engaging means. The multi-beam displacement means can be fixed at several locations. It is preferred to fix the second beam of the first portion by receptacles 79. The method of fixing the second beam can be by any method known to those skilled in the art. As an alternative, the displacing beam 56 of the inner portion 47 can be fixed, and the second beam of the outer portion 37 can be a displacing beam.

Block 31 also has at least two sensing means to sense the displacement or deflection of the inner portion 47 and outer portion 37 relative to each other. One sensing means is located on the outer portion in displacing beam 38 which is opposite to the displacing beam 56 of the inner portion 47. This sensing means 73 is located in a cavity 72, located in the outer portion opposite to target area 74 on the side of displacing beam 56 in the inner portion 47. Although this is the preferred location of the sensing means, any other location can be used, where the displacement of displacing beam 56 can be sensed. The second sensing means is located to sense deflection or displacement at nearly 90° from the displacement or deflection sensed by the first sensing means. The sensing means 74 can be located in a cavity 75 anywhere in the outer portion 37 to sense the displacement of displacing beam 38. Preferably, the sensing means 74 is located in cavity 76 in the outer portion connecting beam 41. Opposite the sensing means on the inner portion is target area 77 located on the substantially fixed beam 57 of the inner portion 47. The types of sensing means and target areas used must be related in order to initiate a signal upon detection of a displacement in the inner and outer portions. The nearly 90° relationship of the displacement of the inner and outer portions and of the first sensing means to the second sensing means would depend upon a nearly parallel arrangement of the beams of the inner and outer portions. If the displacing beam and second beam of the outer portion and the displacing beam and substantially fixed beam of the inner portion are not exactly parallel in alignment through the connecting beams, then the signals initiated by the sensing means will have to be corrected mathematically. The correction would be for a cross coupling effect of the force component of tension on the filamentary material contacting the engaging means 32.

Generally, the type of sensing means used can be any sensing device known to those skilled in the art to sense the deflection of a solid member and nonexclusive examples include those given for FIG. 1. Preferably, the type of sensing means used for the planar type displacement means 31 of the present invention is the linear variable differential transducer (LVDT) with the magnetic core or resistive core target areas. With this type of sensor, the target areas on the inner portion 47 are preferably located in cavities rather than merely attached to the side surface of the inner portion facing the slots. One of these cavities is shown in FIG. 2 at 77, where the cavity has an attachment device like a set screw to hold a thin wire 78, which is attached to a magnetic core in sensor 74. With this arrangement, the displacement of the target area 77 is communicated by wire 78 to the magnetic core in the sensing means 74. The sensing means 73 preferably functions in the same manner. The two sensing means can be connected to one or more, preferably two, conducting means as shown in FIG. 1 and the conducting means can be associated with the indicating means in a manner similar to that of FIG. 1 to conduct the signals initiated by the sensing means to the indicating means.

Figure 3:
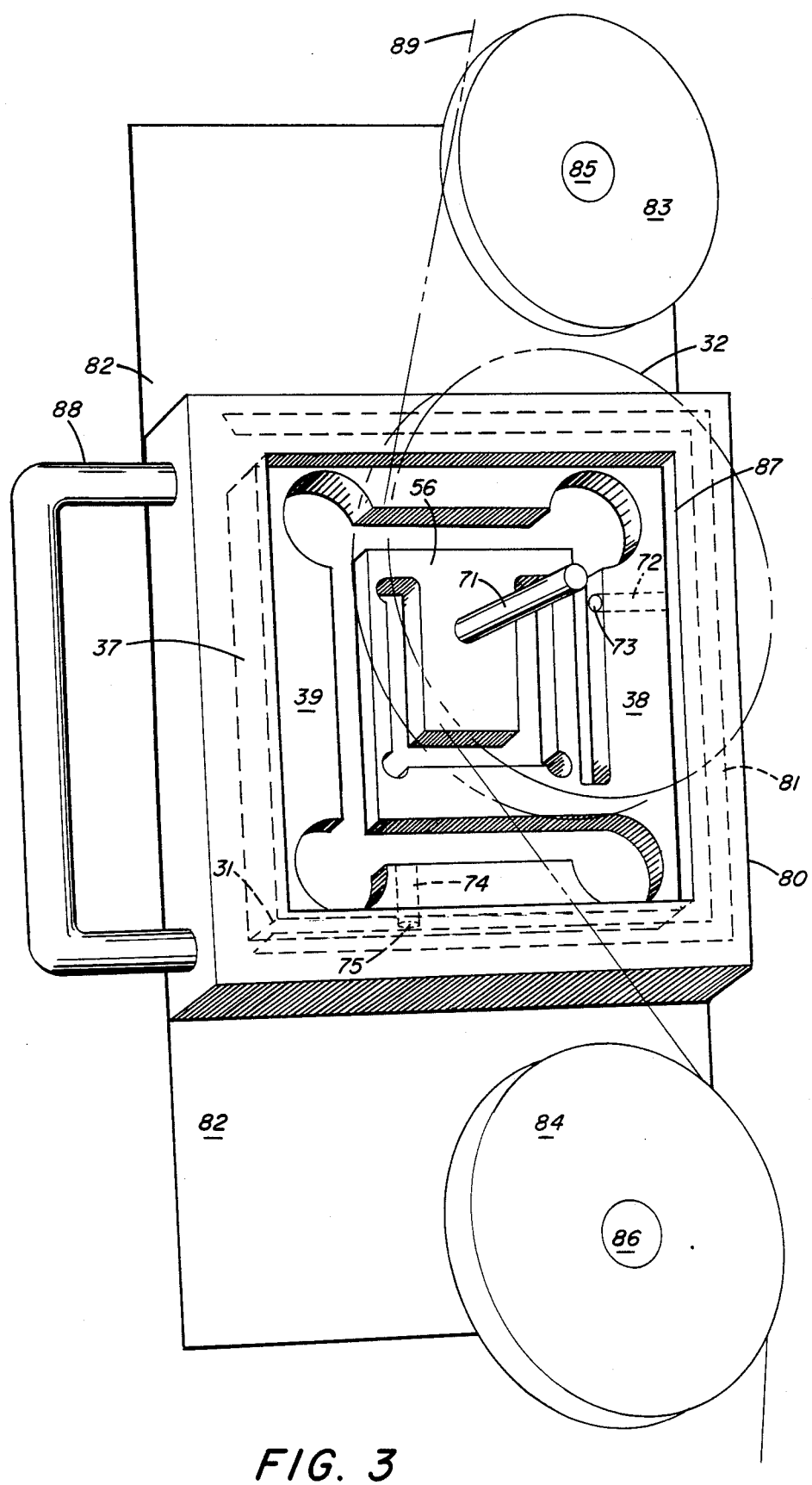
FIG. 3 is an isometric top view of the tension measuring device of the present invention showing the planar displacement means with the outer and inner portions and their site of connection, sensing means, and a housing along with the engaging means and a multi-membered bending means.

As shown in FIG. 3, where numbers similar to those of FIGS. 1 and 2 indicate similar features, block 31 is encased in a housing 80. When the housing is used, the sensing means 73 and 74 can be located in the beams of block 31 so as not to extend beyond the cavities 72 and 75 respectively into the housing. Also, the sensing means could be arranged to extend into the housing from the cavities to be in sensing engagement with the target areas on the inner portion 47 of block 31. As shown in FIG. 3, the housing has a front and back segment 81 and 82 respectively. The block 31 is situated in housing 80 with sufficient available space for holding wires to and from the sensing means and for movement of displacing bemms 38 and 56. The block 31 is fixed to the housing from any fixed beam, for example, the second beam 39 of the outer portion 37 or beam 56 of the inner portion 47. One segment of the housing in FIG. 3, segment 82, extends beyond the housing proper which holds block 31. The extensions of segment 82 serve as a base for contact points 83 and 84, through attachment members 85 and 86 respectively.

Through the other segment in FIG. 3, segment 81, the attachment means 71 protrudes to be attached to an engaging means 32. The segment 81 of housing 80 is cut away to show the contained block 31. The space which holds the wiring and allows for displacement of the beam 38 is shown in phantom as 87. This space is preferably around 0.03 to 0.125 inch (0.08–0.32 cm) and most preferably 0.06 inch (0.16 cm). The attachment means 71 can be any solid member such as a stud, shaft or the like to connect block 31 to the strand engaging means 32. As in FIG. 1, the strand engaging means can be stationary or mounted for rotation on attachment means 71 or the attachment means 71 can be mounted for rotation in block 31 on the inner portion 47. Any of the nonexclusive examples of strand engaging means mentioned for FIG. 1 such as pulleys, gathering shoes and other various contact points used on strand conveying processes can be used with the planar displaceaent means as shown in FIG. 2. Also as shown in FIG. 3, the housing can have support means 88 which can serve to hold the planar tensiometer in a process for conveying filamentary material to produce a fixed angle of bend. In this embodiment, the housing support means would be the bending means. Even when the planar displacement means as shown in FIG. 2, is without a housing, the housing support means can be attached to one of the fixed beams. Therefore, it is not necessary that the planar displacement means of the tension measuring device of the present invention have a housing, but it is preferred that the displacement means has the housing as shown in FIG. 3. The operation of the planar multibeam tensiometer for filamentary material making a fixed angle of bend around the engaging means 32, where the planar tensiometer is supported in a process is more fully described in FIG. 4.

As shown in FIG. 3, if the housing support means 88 is not to be used for making the fixed angle of bending of the filamentary material in an in-line fashion for a process, the support means 88 serves as a handle. The handle 88 allows for portable usage of the tension measuring device of FIG. 3 in conjunction with conducting means and indicating means similar to that described for FIG. 1 associated with the sensing means through housing 80. In any portable use, including that of the tensiometer of FIG. 1, there must be at least two additional contact points for the filamentary material in addition to engaging means 32. These contact points make a guide path for the filamentary material to function as the bending means to bend the filamentary material. As shown in FIG. 3, a second contact means 83 and a third contact means 84 can be attached to the housing 80 to provide an offset so as to cause a fixed angle of bend of the filamentary material around the active first engaging means 32. This causes the displacements in the displacement beams in the block 31 of FIG. 3.

In the portable mode of operation, the filamentary material 89 is placed in contact with engaging means 32 and contact means 84. This contact is on the opposite side of engaging means 32 from the contact with contact means 84. The tension measuring device as depicted in FIG. 3 is then rotated using handle 88 so the filamentary material 89 approaches the contact means 83. Once the filamentary material tangentially contacts the contact means 83 on the same side of means 83 as the side contacted by the filamentary material on engaging means 32, the tension measurement is taken. This tension measurement would be supplied through the indicating means and the conducting means not shown in FIG. 3 but shown in FIG. 1. Contact of the filamentary material to contact means 83 in excess of tangential contact is to be avoided. More contact would result in the introduction of error into the measurement because of uncompensated friction. The friction would arise from the excess contact of the filamentary material with contact means 83. The contact means 83 and 84 can be rotatable or stationary pulleys, rollers, guides, pins and the like known to those skilled in the art of processing filamentary material. Since the contact of the filamentary material with contact means 83 involves minimal contact, it is preferred that this contact means is just a pin.

FIG. 4 illustrates the positioning of the tension measuring device of the present invention with the planar configuration displacement means in an in-line fashion for a process of forming filamentary material. The positioning depicts how the housing support means 88 functions as the bending means in taking advantage of the natural bend in the processing of the plurality of fibers into one or more strands to measure the tension of the fibers and strands. Preferably, the fiberizable material and fibers formed therefrom are glass although any heat softenable, fiberizable material can be used as the filamentary material in any process known to those skilled in the art for forming those fibers. Nonexclusive examples of fibers which can be attenuated from a heat softenable material includes fiberizable glass compositions, polyesters, polyamides and cellulosic materials and like materials contained in a fiber forming apparatus. FIG. 4 shows a process for forming glass fibers, where the fiberizable, heat softenable material is glass 91 which is contained in a bushing 90. The bushing has numerous orifices 92 through which the molten glass is attenuated into a number of glass filaments 94. The glass fibers can be formed from any fiberizable glass composition such as "E-glass", "621-glass" and any more environmentally acceptable derivatives thereof such as low or free boron and fluorine compositions. The fibers are pulled from the bushing and when sufficiently cooled, they contact applicator 100, where they are treated with a chemical treating composition. The treated fibers are gathered by a gathering shoe mechanism generally illustrated as 96 into a unitary glass fiber strand 98. The one or more unitary strands are pulled from the gathering shoe 96 to spiral or guide 101. The spiral 101 assists in placing the strand or strands on winder 104 to build up a layered package 103 on mandrel 102 of winder 104. It is winder 104 which provides the pulling or attenuation force for the fibers and strand throughout the formation process beginning at the bushing 90.

The gathering shoe 96 is attached to attachment means 71 which is attached through housing 80 to the block of the tension measuring device 31 not shown but similar to FIG. 3. The block of the tension measuring device 31 with sensing means is inside housing 80 which has both a front and back section. The housing 80 is located in front of the applicator 100 so the strand engaging means 32 of the tension measuring device replaces and functions as the gathering shoe 96. Typically the area between the gathering shoe and the applicator is a rather crowded area in fiber formation and the planar dimensions of the tensiometer aid in measuring tension in-line in the fiber forming process without disturbing the process to too great an extent. The tensiometer can be mounted by support mounts 88, which function as the bending means, to the same support apparatus, generally 95, to which the applicator is supported to a wall member 97. The support mounts 88 attach the housing 80 to the tension measuring device to the applicator support 95 in a manner that the gathering shoe engages the filaments to cause a bend in the filaments or to take advantage of the natural bend of the filaments about the gathering strand engaging means 32 functioning as gathering shoe 96. If the tension measuring device did not have a housing 80, the support mounts 88 would be attached to the second beam 39 of the outer portion 37 at receptacles 79 in block 31 of the tension measuring device 194 as shown in FIGS. 2 and 3. Preferably, the tension measuring device has the housing 80 with at least the back and front sections to cover the housing proper.

The filaments 94, which are drawn at speeds of from about 2500 to 18,000 feet per minute or more (762 to 5,486.4 meters per minute or more) come across the strand engaging means 32 functioning as gathering shoe 96 and undergo a natural processing bend to the left in route to spiral 101 and winder 104. This natural bend can be used as the fixed angle of bend which is further illustrated in FIG. 5 as the bend which is the alpha bend used in determining the tension upon the strand. The spiral and winder are rotated by any suitable motor or motors known to those skilled in the art and are not shown in FIG. 4. These motors may be connected to adapting devices such as pulleys and belts to rotate the winder and the spiral as known to those skilled in the art. The fixed angle of bend of the fibers and strand about the gathering shoe 96 causes a force to be exerted on the attachment means 71. This force on the attachment means 71 translates into a displacement of the inner and outer portions of the tension measuring device along different axes for each portion. The displacement of the two portions of tensiometer are sensed through sensing means 72 and 74 as shown in FIGS. 2 and 3 but not FIG. 4 for the different directions, along different axes which have preferably a 90° relationship to each other. The sensed displacements cause the sensing means to initiate a signal by preferably a change in source voltage which is conducted by a conducting means as shown in FIG. 1 to a tension indicating device not shown in FIG. 4 but comparable to that shown and described in FIG. 1. The conducting means and indicating means of FIG. 1 can be positioned in FIG. 4 so as not to interfere with fiber formation but to be convenient for tension measurements.

Figures 5, 6:
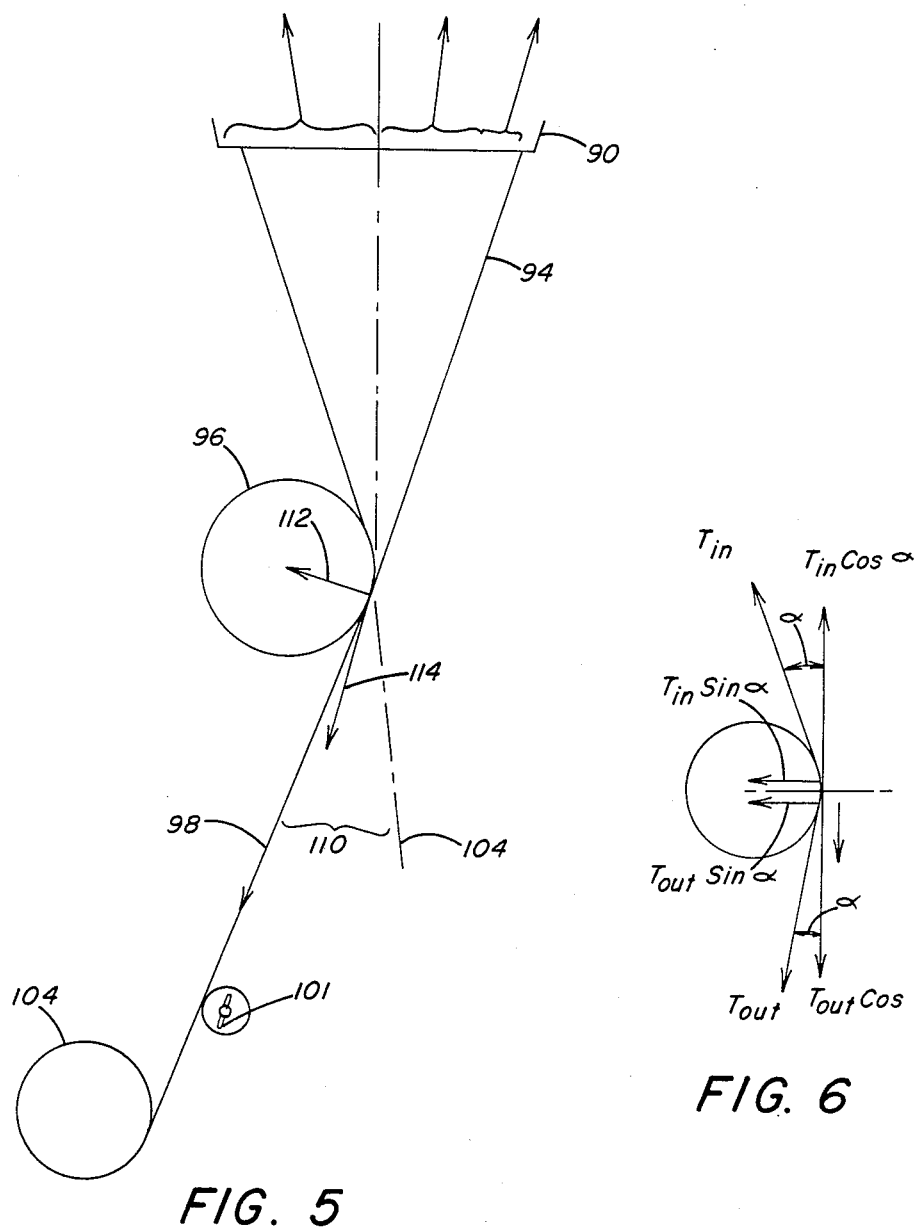
FIG. 5 is a vector diagram representing tensile forces involved using the invention as a gathering point for individual filaments according to the principles of the present invention.
FIG. 6 is a vector diagram showing both tensile forces in a strand turned on a surface through an angle alpha and the forces acting on such surface because of the turning of the flexible linear material.

FIG. 5, where similar numerals as those of FIGS. 1–4 indicate similar features, further illustrates the advantage taken of the natural bend in the production of a plurality of fibers into one or more strands and the measuring of the tension of the fibers and strands. The fibers 94 are attenuated from the forming bushing 90 by the force applied to the strand from winder 104. The fibers are gathered into one or more strands by strand engaging means 32 acting as gathering shoe 96. At the gathering shoe which is enlarged beyond its proportion to the other elements in the process of forming fibers for the purposes of description, the strand is bent to the left in FIG. 5 away from the vertical plane under the bushing 90. This angle, 110, is the angle of bend $\alpha$ which is used in calculating the components of the tension. The angle stays the same until the strand contacts spiral 101 and then the angle may increase for the strand being placed on a package of winder 104.

The force components resulting from the bend which is a natural bend in the manufacture of fibers into strands are given in FIG. 6. There it is shown that both the tension-in and the tension out can be measured and the components resulting from the sines and cosines of the angle $\alpha$ can also be determined. In FIG. 5, 112 is the horizontal component of the force and 114 is the vertical component of the force.

From the equation for tension as a function of the forces in the horizontal and vertical directions, the formula for tension can be obtained. The tension in is equal to the horizontal force divided by 2 times the sine of α minus the vertical force divided by 2 times cosine α. This follows since the horizontal force is equal to the horizontal constant times the voltage output in the horizontal direction and the vertical force is equal to the vertical constant times the vertical voltage output. The constant for proper scaling is measured in volts per gram, and the formula for the tension-in then becomes K multiplied by the force in the (H) horizontal direction divided by 2 times cosine α minus K multiplied by the force in the (V) vertical direction by two times the cosine of α. If KH is set equal to 2 times sine α kilograms per volt and KV is equal to two times the cosine α in kilograms per volt, the tension-in is equal to two times the sine of α divided by two times the sine α times the voltage output in the horizontal direction minus two times the cosine of α divided by two times the cosine of α times the voltage output in the vertical direction. In other words, the tension in is equal to the voltage output from the horizontal minus the voltage output from the vertical. In measuring both axes of force simultaneously, the major component or the horizontal component is found along with the vertical component that results from friction and because of this orthogonal force set up, the true input and output tension can now be measured along with the coefficient of friction.

The subtraction of the horizontal component from the (V) vertical component to give tension can be accomplished by connecting the negative or ground references of the signal conditioning means together and using only one indicating means. The positive or high terminal of the indicating means is then connected to the positive or high ends of the signal conditioning means. The ground reference of the indicating means is connected to the positive or high side of the vertical signal conditioning means.

In the embodiments depicted in FIGS. 1–4, the entire embodiments are not the only embodiments for the present invention. The various individual elements and features depicted FIGS. 1–4 can be combined in various combinations with each other to give a myriad number of additional embodiments. To further illustrate the present invention, the preferred embodiment is described further in the following description.

The tension measuring device of the preferred embodiment of the present invention utilizes the planar configuration displacement means as illustrated in FIG. 2. Also, it is preferred that the tension measuring device has a housing that completely surrounds and encapsulates the planar configuration displacement means and sensing means allowing for leads for the conducting means and for displacement of the displacing beams. In a preferred embodiment, the bending means is constituted of the housing supports and the filament engaging means is a single gathering shoe. Such a planar configuration displacement means with housing and a gathering shoe as a filament engaging means is illustrated in FIGS. 2 and 3. Preferably, the tension measuring device is used for measuring tension on glass filaments and strands during the formation process of producing the glass filaments from heat softenable, fiberizable glass batch material as illustrated in FIG. 4. The preferred planar configuration displacement means is made from a block of aluminum and has a weight in the range of about 50 to about 110 grams and most preferably around 100 grams. The housing is preferably made from a polymeric material and most preferably phenol formaldehyde condensate resin.

The planar configuration displacement means is a quadrilateral block having a length and width on the order of 1 to 6 inches, most preferably 3 inches, and a width of around one-half to over 1 inch and most preferably around one-half inch. The outer portion has the displacing beam and second beam which are parallel beams and which are connected by two connecting beams having two spaced apart flexural pivot means on each connecting beam. The two flexural pivot means on each beam are spaced apart by a distance of around ¾ of an inch to 4.5 inches for a length of the planar configuration of 1 to 6 inches. The flexural pivot means has a thickness of around 0.03 inches or less. The outer portion of the planar displacement means is preferably made of one block of material, rather than being separate beams fastened together.

Spaced apart from the outer portion by a series of slots with expanded areas is the inner portion. Preferably, the slots have a length of around 2 inches leading to the expanded areas which are about 0.5 inches in diameter to produce the width of the flexural pivot means of around 0.03 inches or less. The width of the slots leading to the expanded areas is around 0.2 inches. Three of the slots which are interconnected to meet in two of the expanded areas have the foregoing dimensions. The fourth slot which extends from an expanded area formed by the interconnection of this last slot with a slot of the aforementioned series of slots has a length which is shorter than around 2 inches, so that this last slot does not interconnect with more than one of the other slots. Also, it is preferred that this slot have a width of greater than 0.2 inches. Where the last slot does not interconnect with more than one of the interconnecting slots, a connecting site is formed between the inner and outer portions of the planar configuration displacement means. The connecting site generally has a dimension between the noninterconnecting end of the slot which interconnects with only one of the other slots and the noninterconnecting end of the series of slots which ends in an expanded area of around 0.3 to 0.5 inches, and preferably about 0.375 inches. Preferably, the connecting site attaches the inner portion to the displacing beam of the outer portion.

The inner portion of the planar configuration displacement means has the displacing beam and substantially fixed beam which are parallel beams connected together by two parallel connecting beams. The connecting beams each have two spaced apart flexural pivot means. The distance between the flexural pivot means on a tension measuring device, having an outer dimension of around 3 inches square, is around 1.25 inches. The thickness of the flexural pivot means is the same thickness of the flexural pivot means for the outer portion which is around 0.03 inches or less. The substantially fixed beam extends from the single connecting site, which is attached to a displacing beam in the outer portion. The inner portion has the U-shaped slot where the legs have a length corresponding to the distance between the two pivot means on the parallel beams. The width of the legs and base slot are generally around b 0.2 inches. The width of the base slot may be slightly less than the width of the legs of the U-shaped slot. At all four corners of the U-shaped slot are expanded areas generally having a diameter of around 0.2 inch and being in a circular form except that the expanded areas at the tips of the U-shaped slot extend from the side facing the connecting beam of the U-shaped slot. The displacing beam not connected with the connecting site has the extension extending a distance of 1⅛ inches towards the base slot of the U-shaped slot. On this extension is a receptacle for placing a shaft to be connected to the engaging means through the housing.

The sensing means that are placed in cavities at a 90° relationship to each other in the outer portion of the planar configuration displacement means are the LVDTs available from Schaevitz Engineering, Pennsaulin, N.J. The target areas for these sensing means are located on the inner portion. Aluminum wires extend from each sensor and are mounted in holes at the target areas. This enables the magnetic cores in the sensors to detect displacement of the target areas through the displacing beams. In this manner, one sensing means picks up displacement of the outer portion while the other sensing means picks up displacement of the inner portion.

Each sensing means is electrically connected to a conducting means outside the housing which is preferably an LPM-210 signal conditioning module from Schaevitz Engineering. The conducting means are electrically connected to preferably two indicating means, which are two digital volt meters such as those available from Fluke under the trade designation 8000A. The power supply for the electrical circuit is preferably a dual voltage power supply such as that available from Hewlett-Packard under the trade designation 6205.

I claim:

1. A tension measuring apparatus for measuring tension in at least two directions for flexible linear material under tension, comprising:
   a. an engaging means to contact the flexible linear material,
   b. a bending means for providing in conjunction with the engaging means a fixed angle of bend for the flexible linear material,
   c. at least one displacement means associated with the engaging means to be displaced in response to the fixed bending angle of the flexible linear material,
   d. one or more supports in which the one or more displacement means are fixed,
   e. at least two sensing means securely positioned in an angular relationship to each other of other than a linear angular relationship and in a plane substantially parallel to the plane of the strand caused by the fixed angle of bend of the strand and in sensing engagement with the displacement means,
   f. at least one conducting means for conveying at least the signal initiated by the sensing means in response to the displacement of the displacement means,
   g. at least one indicating means for indicating the output of the sensing means in order that scaled output can be calculated into the magnitude of the tension reduced by any coefficient of friction for the flexible linear material.

2. Apparatus of claim 1, wherein the bending means is a first support securely attached to the one or more supports which have one or more displacement means to effect contact of the engaging means with the flexible linear material to cause a fixed bend of the flexible linear material about the engaging means.

3. Apparatus of claim 2, which includes a housing enclosing all but one side of the tension measuring apparatus and to which the first support can be securely attached as a bending means to effect contact of the engaging means with the flexible linear material to cause a fixed bend of the flexible linear material about the engaging means.

4. Apparatus of claim 2, wherein the bending means is at least a second engaging means associated with the first engaging means in an off-set fashion and securely attached to the one or more supports having one or more displacement means so that the flexible linear material contacts the second engaging means after the first engaging means at opposite portions of each engaging means, thereby causing a fixed bend in the flexible linear material.

5. Apparatus of claim 4, which includes a third engaging means associated with the first and second engaging means and securely attached to the one or more supports having one or more displacement means to contact tangentially the flexible linear material before the flexible linear material engages the first engaging means and where the third engaging means contacts the flexible linear material at the same side of the engaging means as the first engaging means to cause a fixed angle of bending of the flexible linear material about the first engaging means.

6. Apparatus of claim 3, wherein both sensing means are attached to the housing.

7. Apparatus of claim 1, wherein the displacement means is a beam on which the engaging means is attached at one end and which is fixed at the other end in the support.

8. Apparatus of claim 1, wherein the sensing means are attached to the support for the displacement means.

9. Apparatus of claim 1, wherein there are two conducting means, one for each sensing means to scale the signal initiated by the associated sensing means and convey the scaled signals to the indicating means.

10. Apparatus of claim 1, wherein the displacement means has a planar configuration and is comprised of more than one displacing beam and which has an arrangement having at least one displacing beam attached to a second beam by two connecting beams at opposite ends of the displacing beam and second beam, thus forming an outer portion, wherein the two connecting beams each have at least one flexural pivot means, and where the arrangement includes an inner portion attached to the outer portion in a spaced apart manner by a connecting site to the displacing beam extending from a beam nearly perpendicular to the displacing beam of the outer portion to substantially fix the extending beam, and wherein the inner portion has a displacing beam nearly parallel to the substantially fixed beam and connected to the substantially fixed beam by two connecting beams, one each connecting at opposite ends of the displacing beam and of the substantially fixed beam and wherein, the connecting beams each have at least one flexural pivot means.

11. Apparatus of claim 10, wherein one of the unfixed beams of the outer or inner portions is connected to the engaging means by an axial member.

12. Apparatus of claim 10, wherein the outer portion and inner portion are surrounded by a housing having an opening through which a shaft attached to the strand engaging means extends and which is laterally and transversely spaced apart from the outer and inner portions to enable the displacement of the displacing beams of the inner and outer portion.

13. Apparatus of claim 10, wherein the conducting means is an electric circuit connected to both sensing means to condition and to scale the signals generated by both sensing means and to convey the conditioned and scaled signals to be indicated as the output of both sensing means corresponding to tension compensated for any friction introduced in taking the measurement.

14. An apparatus for measuring tension in two directions on filamenatry material, comprising:
   a. a displacement means having a top and bottom surface and having:
      (1) an outer portion comprised of a displacing beam and a second beam attached together by a connecting beam at each end, where each connecting beam has spaced apart flexural pivots between the connections to the displacing beam and second beam and where all of the beams extend from the top to the bottom surface of the displacement means,
      (2) an inner portion extending from the top to the bottom and within but laterally spaced apart from the outer portion by being connected to the outer portion at a connecting site between a displacing beam of the outer portion and a beam of the inner portion which is nearly perpendicular to the displacing beam of the outer portion, where said nearly perpendicular beam is substantially fixed by the connecting site, where the inner portion has a displacing beam mounted for displacement to the substantially fixed beam by a connecting beam at each end of the displacing beam, wherein each connecting beam has spaced apart flexural pivots between the connection of the displacing beam to the substantially fixed beam and wherein the displacing beam has an extension extending toward the substantially fixed beam and substantially parallel to the connecting beams to form a U-shaped slot within the inner portion,
   b. an attachment means mounted on the extension of the inner portion,
   c. a strand engaging means mounted on the distal end of the attachment means from the inner portion,
   d. a support means attached to the second beam to fix the second beam to inhibit its displacement, where the support means maintains the tension measuring device in contact with the filamentary material to allow the engaging means to contact the filamentary material at a fixed angle of bending to cause the inner and outer portions of the displacement means to be displaced,
   e. at least two sensing means positioned so that one senses the outer portion displacement and the other senses the inner portion displacement and occur at an angular relation to each other of around 90° and where the sensing means initiate a signal in response to the displacement of the inner and outer portions,
   f. a conducting means connected to all of the sensing means to allow the sensing means to initiate a signal and to conduct an indicatable signal produced by the sensing means,
   g. an indicating means to indicate the output from the signal of the sensing means conveyed by the conducting means as a measurement of tension of the filamentary material reduced by any coefficient of friction arising from performing the tension measurement.

15. Apparatus of claim 14, wherein the strand engaging means is a gathering shoe to combine a plurality of filamentary material into a bundle.

16. Apparatus of claim 15, wherein the gathering shoe is stationary on the attachment means.

17. Apparatus of claim 14, wherein the outer portion has cavities along at least one connecting beam and at least one non-connecting beam in which the sensing means are mounted.

18. Apparatus of claim 14, wherein the inner and outer portions with the sensing means are surrounded by a housing spaced apart laterally and transversely from the inner and outer portions to allow for displacement movement of the portions and which has an opening through which the attachment means extends to attach the engaging means and to which the support member is attached.

19. Apparatus of claim 14, wherein the sensing means are linear, variable, differential transformers.

20. Apparatus of claim 14, wherein the inner portion is laterally spaced apart from the outer portion by a series of four slots where one slot is parallel to one of the beams in the outer and inner portion and where three of the slots interconnect so that the two inner contiguous slots interconnect at both ends while the two outer slots interconnect only connect with the two inner contiguous slots so that the two outer slots do not intersect with each other so that the substantially fixed beam of the inner portion connects to the displacing beam of the outer portion.

21. Apparatus of claim 20, wherein expanded areas are at all intersections of the slots to reduce the cross-section of the connecting beams of the outer portion to form the flexural pivot means.

22. Apparatus of claim 20, wherein the flexural pivots have a thickness of 0.03 inches or less.

23. Apparatus of claim 20, wherein a gathering shoe is rotatably mounted on the inner portion.

24. A method of measuring tension in filamentary material produced in a fiber forming process, comprising:
   a. forming a plurality of fibers,
   b. treating the plurality of fibers with a chemical composition,
   c. contacting the treated fibers to gather them into one or more strands at a gathering means,
   d. measuring the tension of the one or more strands by a series of more than one displacing beam mounted for displacement along two coplanar axes in a plane that is parallel to that in which the fibers contact the gathering means, where the series of displacing beams are arranged so that at least one displacing beam is in an outer portion and at least one is in an inner portion which is within but laterally spaced apart from the outer portion and which is connected to the outer portion by a beam of the inner portion perpendicularly connecting to the displacing beam of the outer portion, wherein the outer portion has at least one displacing beam attached to a fixed beam by two connecting beams, one at each end of the displacing and fixed beams, wherein each connecting beam has at least one flexural pivot means between the connections to the displacing and fixed beams, and wherein the inner portion has a displacing beam that is substantially parallel to the perpendicular connecting beam of the inner portion and attached to the perpendicular attachment beam by two connecting beams at each end of the displacing beam, where each connecting beam has at least one flexural pivot means between attachments to the displacing beam and perpendicular attachment beam, and wherein the displacing beam of the inner portion has a shaft attached to the gathering means, e. winding the strand off-center from directly under where the strand is gathered to cause a fixed angle of bending in the strand about the gathering means, f. sensing the deflection of the displacing beams of the inner and outer portions caused by the tension in the moving strand that is in engagement with the gathering means, g. indicating the tension as an output response to the sensing of the deflection, where the tension has been compensated for any friction in taking the tension measurement.

25. A method of measuring tension in at least two directions for flexible linear material under tension, comprising:

a. engaging the flexible linear material to cause a fixed angle of bending of the flexible linear material about at least one main engaging surface, where any engaging surfaces that are used in generating the fixed bend which are before the main engaging surface only tangentially contact the flexible linear material, b. displacing one or more beams fixed at one more ends in a support in response to the fixed bend of the filamentary material about the main engaging surface, c. sensing the displacement of the one or more beams along two axes that are parallel to the plane in which the flexible linear material is engaged to produce the fixed angle of bend, d. initiating a signal for each sensed displacement, e. conditioning each signal to permit electrical conveyance of the signals, f. scaling the signals to values for the calculation of the magnitude of tension and coefficient of friction, g. calculating the magnitude of tension and coefficient of friction to obtain tension free of any friction caused in taking the measurement.

* * * * *